May 26, 1970 — L. G. HORWITT ETAL — 3,513,885
TIRE VALVE ASSEMBLY FOR COLLAPSIBLE TIRES AND METHOD OF INFLATING THE SAME
Filed Aug. 24, 1967 — 2 Sheets-Sheet 1
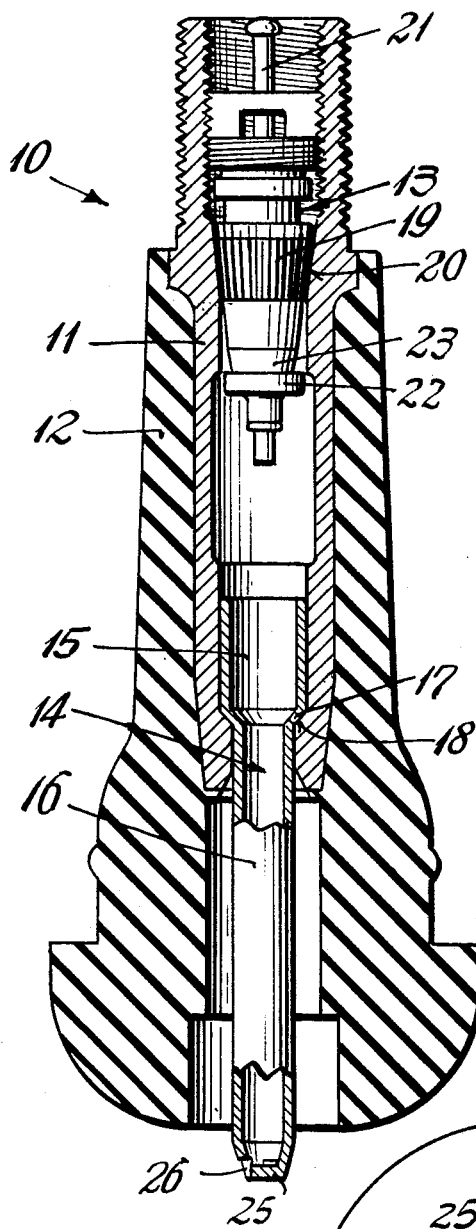
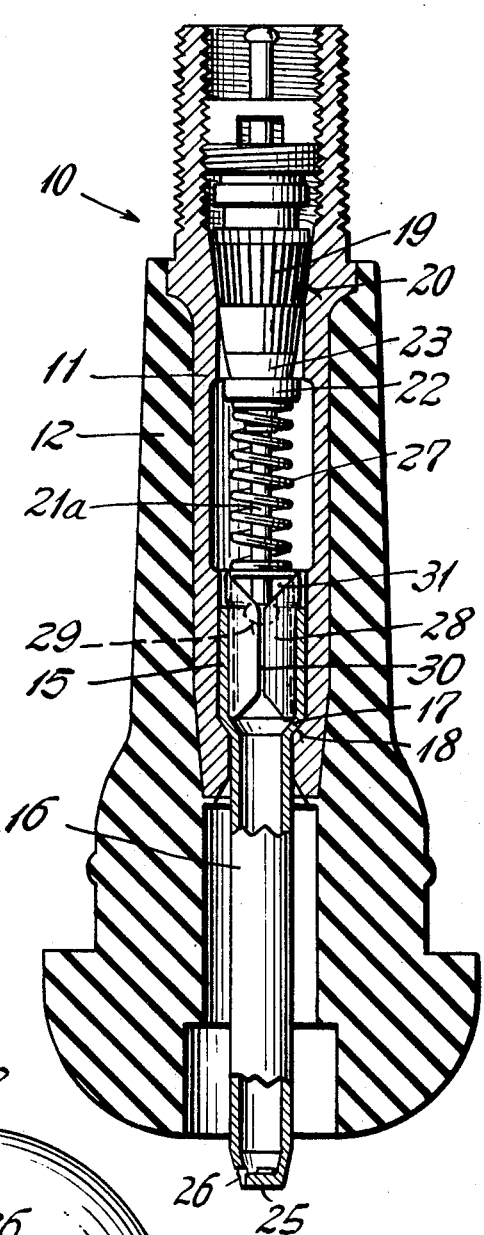
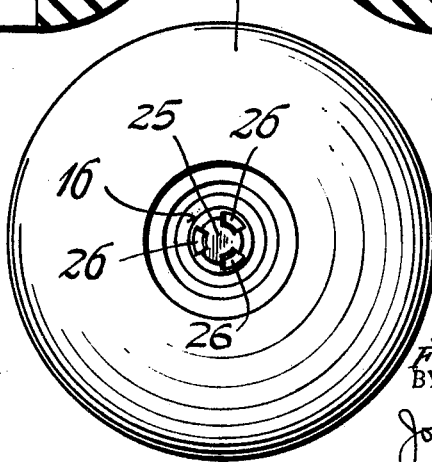
INVENTORS
Laurence G. Horwitt
Frederick E. Allen
BY Johnson and Kline
ATTORNEYS May 26, 1970     L. G. HORWITT ETAL     3,513,885
TIRE VALVE ASSEMBLY FOR COLLAPSIBLE TIRES AND METHOD
OF INFLATING THE SAME
Filed Aug. 24, 1967     2 Sheets-Sheet 2
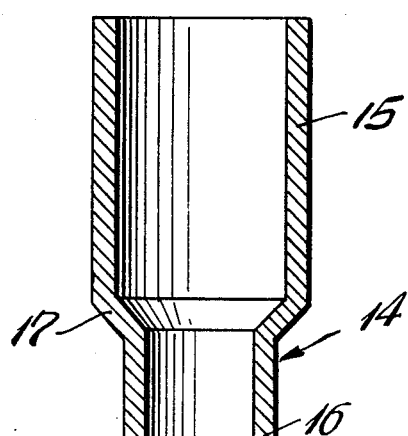
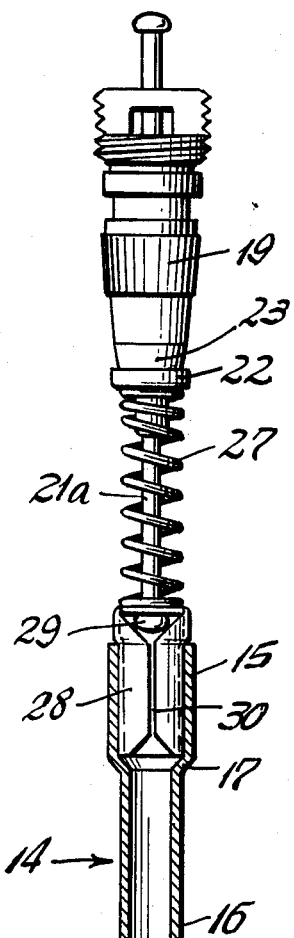
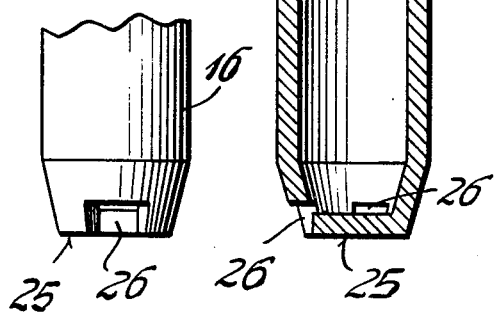
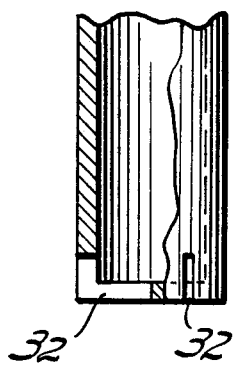
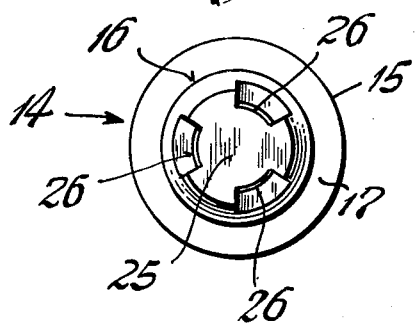
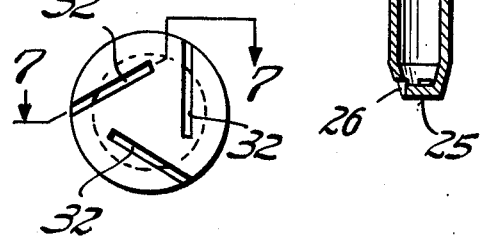
INVENTORS
Laurence G. Horwitt
Frederick E. Allen
BY
Johnson and Kline
ATTORNEYS United States Patent Office 3,513,885
Patented May 26, 1970

3,513,885
TIRE VALVE ASSEMBLY FOR COLLAPSIBLE TIRES AND METHOD OF INFLATING THE SAME
Laurence G. Horwitt, New Haven, and Frederick E. Allen, Short Beach, Conn., assignors to Casco Products Corporation, Bridgeport, Conn., a corporation of Connecticut
Filed Aug. 24, 1967, Ser. No. 663,141
Int. Cl. F16k 15/20; B60c 29/00
U.S. Cl. 141—4
13 Claims

ABSTRACT OF THE DISCLOSURE

A tire valve assembly and method for the inflation of tires, particularly collapsible tires for emergency use, through said valve with a condensed vaporizable gas, whereby distribution and vaporization of said condensed gas throughout the space within the tire is expedited and inflation of the tire is rendered substantially instantaneous by atomizing said condensed gas within the tire.

---

To facilitate transportation of spare tires in "compact" automobiles in which storage space is so limited that the normally used spare tire and extra wheel cannot be accommodated, it has been proposed to employ an emergency spare tire which is so flexible when mounted on the extra wheel that it may be substantially flattened and made to lie in the well of the wheel and thus fit in a much smaller space than would otherwise be needed.

Of course, when use of the collapsible emergency spare tire is required, it must be inflated, and for this purpose it has been proposed to provide a portable inflator comprising a suitable tank containing gas under pressure to be screwed onto the valve of the tire by a connection which, when fully applied, causes the tank to be pierced so that the gas can travel from the tank through the connection and tire valve to the interior of the tire. Such an inflator is disclosed in a copending application of L. G. Horwitt, Ser. No. 647,386, filed June 20, 1967.

Since it is not known at what atmospheric temperature the tire will be needed and must be inflated, the gas in the tank must be capable of satisfactorily inflating the tire over a wide range of temperature conditions. At the present time, it is the consensus that the gas used must be effective to satisfactorily inflate the tire when expanded in the tire over a range of temperatures from −20° F. to +110° F.

The gas which is used must, for safety sake, be non-explosive, and noncorrosive of the materials of the tank, the valve parts and the tire. Of the gasses known to satisfy this requirement, there are few which can be compressed into a small enough tank to serve the ultimate purpose and under the range of temperatures of use.

It has been proposed that certain fluorocarbons be used for the purpose of inflating collapsible tires, but many of these gases have been found to be unsatisfactory for various reasons.

We have found that one particular gas, chlorodifluoromethane, has given promising results, but we have also discovered that this gas, within the lower portion of the acceptable temperature range, is condensible, and the semisolid particles thereof on entering the tire do not immediately convert to the gaseous state, and thus, without more, does not inflate the tire satisfactorily. We have found that after the injection of the gas into the previously substantially air free tire, if the tire is rolled or bounced on the ground, the semisolid gas apparently volatilizes and satisfactorily inflates the tire. It was suspected that this condition results from heat developed by the friction of the parts of the tire in flexing, or the agitation of the gas within the tire caused the semisolid condensed gas to volatilize.

However, it was discovered by the present invention that by atomizing the condensable gas as it leaves the tire valve and enters the tire, the tire is immediately inflated to satisfactory pressure without the necessity of rolling or bouncing the tire on the ground.

The atomizing of the gas is accomplished, according to the present invention, by combining an atomizing nozzle with the tire valve and positioning the outlet end of the nozzle so that it projects sufficiently beyond the inner end of the valve body to permit the spray of gas and any semisolid particles thereof to be greatly disbursed in the tire in the space surrounding the tire valve and semisolid particles volatilized.

A feature of this invention is the provision of an atomizing nozzle that can be conveniently inserted in the valve sleeve of a tire valve of standard construction which is commonly used on passenger automobiles as well as other vehicles. The presence of the atomizing nozzle of this invention in the tire valve does not interfere with the normal inflation of the tire, and is so arranged that when a standard wheel and tire is to replace the emergency wheel and tire, the latter may be easily deflated to be collapsible on the spare wheel and stored in the automobile in the place from which it was taken.

The method of the present invention of inflating an emergency collapsible automobile tire is characterized by the step of atomizing the gas as it enters the tire.

Other objects and advantages of this invention will be clear to those skilled in the art in the light of the present disclosure including the drawings, in which:

FIGS. 1 and 2 are enlarged vertical sections of valve assemblies according to different embodiments of the present invention;

FIG. 3 is a bottom plan view of the assemblies of FIGS. 1 and 2;

FIG. 4 is an enlarged segmented vertical section of the atomizer embodied in the valve assembly of FIG. 1;

FIG. 5 shows the bottom portion of the atomized insert of FIG. 4 in elevation;

FIG. 6 is a bottom plan view of the atomizer insert of FIG. 4;

FIG. 7 is like FIG. 5 showing an atomizer insert according to another embodiment of the invention, the section being taken on line 7—7 of FIG. 8;

FIG. 8 is a bottom plan view of the atomizer insert of FIG. 7; and

FIG. 9 is a view partly in section of the atomizer-core unit insert embodied in the valve assembly of FIG. 2.

The present invention resides in part in our discovery that tires can be substantailly instantaneously and completely inflated to full pressure using a condensed liquid or semisolid gas by atomizing or nebulizing the condensed gas within the tire as it enters the tire. In this manner the condensed gas is reduced to a spray of fine particles and dispersed within the tire, thereby preventing the deposit of the material in one area of the inner surface of the tire. Also the condensed gas is reduced to a form in which it is substantially completely exposed to whatever atmospheric air and gas is present in the collapsed and inflating tire, due to the fineness of the particle size, and is able to substantially instantaneously vaporize, expand and develop sufficient pressure within the tire.

This is accomplished, according to the present invention, by providing a tire valve assembly having an atomizer having spray ports which are located adjacent and preferably extend below the bottom of the valve body into the interior of the tire.

Preferably, the atomizer comprises an insert which can conveniently be placed in valve bodies which are now available on the market and which are installed in most automobile tires or the rims to which they are mounted. However, the atomizer may form an integral part of a valve core, if desired.

When in the form of a separate tube to be inserted in a tire valve, the atomizer is provided with an inclined shoulder which engages a complementary shoulder on the valve tube to have gas-tight engagement so that the inflating gas will flow through the atomizer instead of around it.

The atomizer ports extend below the bottom of the valve body so that the spray emitted from the ports is not impeded or blocked by the inner end of the valve body.

Since the atomizer ports may restrict or retard to too great an extent evacuation of the gas in the tire when that is desired, the insert is made removable from or at least movable in the valve so that when the core of the valve is removed from its seat or entirely from its sleeve, the gas in the tire can escape around the atomizer.

As shown in FIG. 1, the valve 10 comprises a valve sleeve 11 enclosed by a body 12, usually made of rubber, a valve core 13 threadably engaging the threaded interior of the valve sleeve, and an atomizer tube 14. The atomizer consists of a tubular body having an open upper section 15 of greater diameter than a lower section 16, the sections being joined by a conical section 17, which, when seated, makes air-tight engagement with a seat 18 on the lower inside wall of the valve sleeve 11.

The valve core 13 is normally in air-tight engagement with the valve sleeve 11 due to the seating of a conical core seal 19 on a conical seat 20 on the valve sleeve. Extending through the valve core 13 is a stem 21, the lower end of which carries a valve disk 22 which is spring-pressed against a valve seat 23. In the usual short style Shrader valve shown in FIG. 1, the spring is contained in the valve core.

In use, condensed gas under pressure is contained within a tank of an inflator such as illustrated and described in the aforementioned copending application and has a threaded outlet nozzle adapted to be screwed on the threaded end of the valve sleeve. As the inflator is screwed into air-tight engagement with the valve sleeve, the stem 21 of the valve core 13 is depressed to move the valve disk 22 and open the valve. Then the gas tank is perforated to allow the condensed gas to rush into the valve sleeve through the open valve core and through the atomizer tube 14. The force of the condensed gas seats the conical section 17 of the atomized tube tightly against the seat 18 so that all of the gas must flow into the tire through the atomizer.

The inner end or bottom 25 of the tube 16 is adjacent and preferably extends slightly below the bottom of the valve body 10 as shown, and is closed except for the narrow orifices 26. The condensed gas and particles of the gas strike the bottom 25 of the tube and are discharged in atomized form as fine sprays of minute particles which volatilize almost instantly to develop instant gas pressure within the tire. The atomizing orifices 26, of which there are preferably three, are directed downwardly and outwardly to cause the spray to fan out in three directions, and thus cause the particles to be more readily distributed and volatilized in the tire.

After the emergency wheel and tire have been used and removed from the vehicle to be stored on the vehicle, the gas in the tire may be evacuated by depressing the valve stem 21 to unseat the valve 22 which will allow the gas to escape through the valve core 13, or the latter may be unscrewed from the valve sleeve 11 sufficiently to permit the gas to escape past the conical seal 20, and thus permit more rapid deflation of the tire.

The atomizer 14 is movably seated in the valve sleeve 11 so that when the gas is allowed to escape past the valve core, the drop in pressure in the sleeve will allow the atomizer tube to become unseated, and this allows the gas to pass around it and out of the sleeve instead of merely escaping through the orifices 26.

In the event that the valve for the collapsed tire was not originally equipped with an atomizer of the present invention, it is merely necessary to remove the valve core 13 and insert the atomizer tube into the valve sleeve, the largest diameter of the atomizer tube being sufficiently small to permit this operation. The core 13 is then replaced in the sleeve before the inflator is applied to the valve. The atomizer may be seated on the conical seat 18 by the use of a slender instrument, but if this is not done, the force of the inrushing gas will seat the tube in the sleeve.

The feature of the present invention is, therefore, the provision of an atomizer which may be inserted into the valve sleeve of a tire valve.

The atomizer orifices 26 are shown more clearly in FIG. 3 which is a bottom plan view of FIG. 1 showing the valve body 12, the lower section 16 of the atomizer insert and the ports 26 on the beveled tip thereof.

In the device shown in FIGS. 2 and 9, the valve core and the atomizer are combined as a unit for convenient removal of the atomizer from the valve sleeve. The valve core is of the long type commercially available on the market. It is for the greater part the same as the short type core shown in FIG. 1, and the same reference numbers are applied to corresponding parts.

However, in the form shown in FIGS. 2 and 9, the valve has a long valve stem 21a, an external spring 27 surrounding the lower end of the stem and an inverted cup 28 attached to the stem by a head 29 on the lower end of the stem. As used heretofore, the cup 28 bottomed on the inclined shoulder 18 of the valve sleeve 11. In its use, according to the present invention, the cup 28 is pressed into the upper end of the atomizer tube until it comes to rest on the internal shoulder formed by the inclined portion 17 of the atomizer tube 14.

The cup 28 may be formed somewhat oversized of resilient sheet material so as to have one or more longitudinal slits 30 which permit the cup to contract when being inserted in the portion 15 of the atomizer tube, and by the resiliency of the material be held frictionally in the tube. Or, the cup 28 may be soldered or otherwise fastened to the tube 14.

The valve stem 21a and the cup 28 are thus formed into a unit which may be inserted in the valve sleeve and removed therefrom as one piece. When it is desired to deflate the tire, the valve core may be unscrewed from the valve sleeve to remove the valve core and atomizing tube as a unit, thus permitting the rapid and unobstructed evacuation of the gas from the tire.

The cup 28 has top openings 31 to facilitate the flow of the gas through the cup to the atomizer tube, the top opening extending beyond the upper end of the tube.

When the cup 28 bottoms on the shoulder on the tube 14 and the latter bottoms on the seat 18, further screwing of the valve core into the sleeve will cause the spring 27 to be placed under tension in the same way as when an ordinary long valve core is screwed into the end of an ordinary tire valve sleeve to hold the valve 22 against the valve seat 23.

In the event that the valve for a collapsible tire does not come equipped with the atomizer of the present invention, it is merely necessary to unscrew the valve core 13 from the valve stem and discard the valve core and then insert the combined valve core and atomizer of the present invention, in which case the screwing of the valve core to its operative position will cause the spring 21a to resiliently press the conical section 17 of the atomizer tube against the seat 18 of the valve sleeve.

A feature of the present invention is, therefore, the provision of a combined valve core and atomizer which can be inserted in the sleeve of a common valve as a unit.

FIGS. 7 and 8 illustrate a modified form of orifices for the lower end of the atomizer tube. Whereas the orifices 26 of the atomizer tube of FIG. 5 appear as horizontal slits from within the section, the orifices 32 of FIGS. 7 and 8 are vertical slits angularly disposed relative to each other and the diameter of the tube so that a swirling movement is imparted to the spray particles as they enter the tire and more rapidly vaporize.

Other forms of atomizer orifices can also be used to achieve the objects of this invention including openings of various sizes and cross-sections.

The present invention provides a novel method of inflating tires with condensed gases, many of which heretofore were impractical for such use because of their semisolid condition. Many semisolid condensed gases of the "Freon" type, particularly "Freon 22" which is chlorodifluoro-methane, are excellent inflators and provide excellent cushioning effect because of their ability to undergo slight volume changes without a corresponding change in pressure. This provides a smoother ride in that the tire is able to travel a rough surface without causing an increase in the pressure of the gas within the tire. Thus road vibrations are absorbed by the gas within the tire rather than being transmitted to the vehicle. Condensed "Freon 22" and similar gases are semisolid or gelatinous and require a period of time to vaporize and develop full pressure within a tire. Therefore, such condensed semisolid gases had not been used heretofore for inflation purposes.

However, by atomizing the gas as it enters the tire, this time lag is substantially eliminated.

Variations and modifications may be made within the scope of the claims and portions of the improvements may be used without others.

We claim:

1. A valve structure having a body having an outlet and a inlet and a passage therethrough from the inlet end to the outlet end, a sleeve received within and fixed to the body, a valve core mounted in the sleeve at the inlet end of the body, and an atomizer nozzle inserted in said passage between the valve core and the outlet end of the body, said atomizer comprising a tube having a portion projecting from the outlet end of the body and having atomizing orifices on said portion.

2. A valve structure according to claim 1, in which the valve core is removably mounted in the valve sleeve, and the atomizer tube has a maximum diameter small enough to permit it to enter the valve sleeve from the inlet end thereof when the valve core is removed from the valve sleeve.

3. A structure valve according to claim 2, in which the valve sleeve and the atomizer tube have portions adapted to slidably engage and also cooperating seat portions to engage and thereby limit the amount that the atomizer tube may project beyond the outlet end of the valve body.

4. A valve structure according to claim 2, in which there are means connecting the valve core to the atomizer tube, whereby the latter and the valve core may be inserted in and removed from the valve sleeve as a unit.

5. A valve structure according to claim 2, in which the valve core has a valve stem projecting into the sleeve toward the outlet end thereof, and there are means on the inner end of the valve stem connected to the atomizer tube, whereby the latter and the valve core may be removed from the valve sleeve as a unit.

6. A valve structure according to claim 5, in which the inlet end of the valve stem is connected to the atomizer tube by an inverted cup having an aperture through which the valve stem extends and beyond which it is headed, the inverted cup frictionally engaging the inlet end of the atomizer tube with sufficient force to cause the latter to be withdrawn from the sleeve through the inlet end thereof when the valve core is being withdrawn from the sleeve.

7. A valve structure according to claim 6, in which the valve sleeve and the atomizer tube have portions adapted to slidably engage and also cooperating seat portions to engage and thereby limit the amount that the atomizer tube may project beyond the outlet end of the body, and in which a coil spring surrounds the valve stem and has one end engaged by a portion of the valve core and the other end engaged by the inverted cup, said spring being under compression and resiliently holding the cooperating seat portion of the sleeve and atomizer tube in gas-tight engagement.

8. The method of inflating a collapsed tire for a vehicle with compressed condensed semisolid gas which comprises the steps of injecting the gas through the tire valve and causing the gas as it emerges from the latter and enters the tire to pass through an atomizing nozzle to break up any semisolid particles contained in the gas and form a spray to cause rapid distribution of the gas in the tire and substantially instantaneously vaporization of the gas and inflation of the tire.

9. The method of inflating a collapsible tire according to claim 8, in which the condensed gas is chlorodifluoromethane.

10. The method of inflating a collapsible tire by means of a compressed condensed gas through the tire valve which comprises the steps of removing the valve core, inserting in the body of the valve a tube having atomizing orifices at its inner end so that the latter extends beyond the inner end of the valve body into the interior of the tire, and propelling said compressed condensed gas into said valve body and through said atomizing orifices, whereby the gas is atomized and dispersed into the interior of the tire to cause substantially instantaneous vaporization of said gas and substantially instantaneous and complete inflation of said tire.

11. The method according to claim 10, in which said condensed gas is supplied by a pressurized inflator which is forced into airtight engagement with the opening of the valve body.

12. An atomizer for insertion in the sleeve in the body of a tire valve when the valve core is removed therefrom comprising an atomizing tube having an upper portion which has a diameter to slidably fit into the valve sleeve and bear on a portion of the wall thereof, a lower portion of smaller diameter, and a conical portion between said upper and lower portions forming a seat for airtight engagement with a matching seat portion on the valve sleeve, the length of the lower portion of the atomizing tube being such that when seated the end of the lower portion terminates adjacent the lower end of the body of the valve, said lower portion of the atomizing tube being closed except for orifices which cause the gas passing through the tube under pressure to issue in the form of an atomized spray.

13. A combined valve core and atomizer for insertion in the sleeve of the valve body of a tire valve comprising a valve core having a valve stem projecting from its lower end, an atomizer comprising an atomizing tube, and means for attaching the atomizing tube to the valve stem, whereby the atomizing tube may be inserted in the valve sleeve and removed therefrom as a unit, the valve core having threaded engagement with the valve sleeve to retain the unit in the sleeve, the atomizing tube and valve sleeve having cooperating seat portions to control the position of the tube in the sleeve with the lower end of the tube adjacent the lower end of the valve body, the lower end of the tube being closed except for orifices which cause gas passing through the tube under pressure to issued in the form of an atomized spray.

References Cited

UNITED STATES PATENTS 1,673,511  6/1928  Hosford _____ 239—600 X (Other references on following page)

| | | UNITED STATES PATENTS | |
|---|---|---|---|
| 1,928,070 | 9/1933 | Moore | 137—223 |
| 2,549,075 | 4/1951 | Fox | 137—223 |
| 2,594,539 | 4/1952 | Brown | 239—583 X |
| 3,407,624 | 10/1968 | Taylor | 239—541 X |

LAVERNE D. GEIGER, Primary Examiner
E. J. EARLS, Assistant Examiner

U.S. Cl. X.R.

137—223; 141—38; 152—427; 239—600